INVENTOR
JOSEPH BRIECHLE

United States Patent Office 3,130,880
Patented Apr. 28, 1964

3,130,880
AEROSOL METERING VALVE
Joseph Briechle, New Canaan, Conn., assignor to Scovill Manufacturing Company, Waterbury, Conn., a corporation of Connecticut
Filed Sept. 6, 1961, Ser. No. 136,298
5 Claims. (Cl. 222—394)

The present invention relates to aerosol valves and more particularly to such valves intended to dispense measured quantities of aerosols produced through the aid of a low boiling point propellent.

With the advent and widespread use of aerosols, many dispensing mechanisms have been proposed for providing a metered spray of the aerosol whereby to avoid wastage of the active ingredients of the aerosol, where a limited amount discharged in the form of a puff or spray would suffice for its intended use. This is particularly true in the dispensing of perfumes, deodorants, anti-perspirants, etc.

Most of the dispensing aerosol metering valves heretofore proposed have been either relatively complicated in construction and/or difficult of assembly and hence costly to produce; and when one considers that practically all aerosol dispensers are intended to be discarded after their contacts have been discharged, the initial cost of the device is of primary consideration.

Accordingly, the object of the present invention is to provide an aerosol metering valve, the construction and assembly of which is relatively simple and fool proof in operation to dispense a metered quantity of the aerosol.

The foregoing and other objects of the invention, not specifically enumerated, are accomplished by the aerosol metering valve hereinafter described and illustrated in the accompanying drawing wherein.

Figure 1:
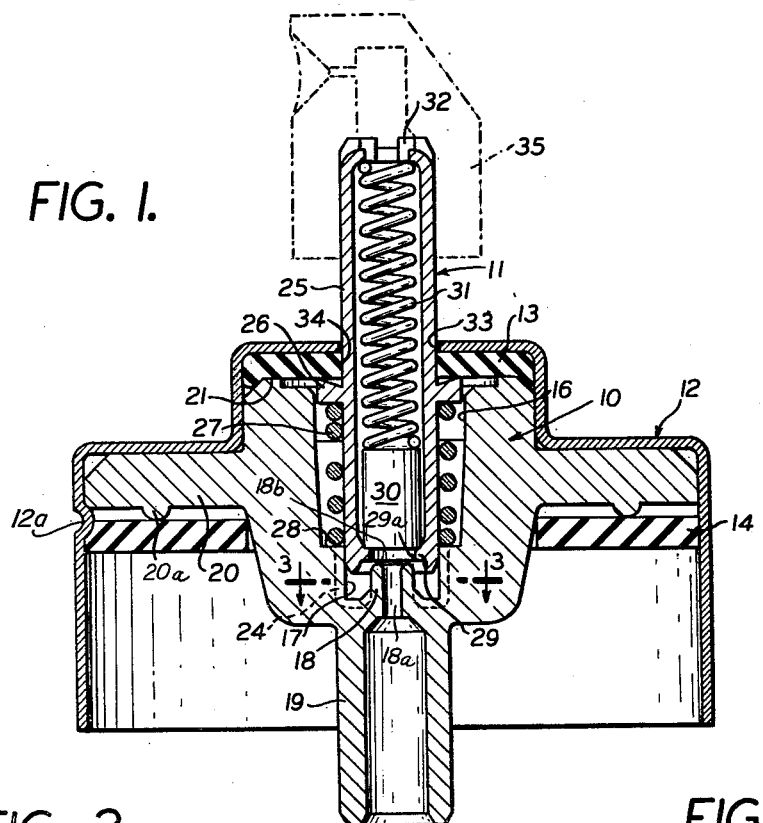
FIG. 1 is a diametrical section through an aerosol metering valve embodying my invention.

Referring to the drawing, the aerosol metering valve of the present invention may be said to consist of a tubular body member 10 and a tubular plunger-stem assembly 11 reciprocably mounted in the body member, the said parts being held in assembled relation by a closure cap 12 and a sealing washer 13 in a well known manner such as by circumferentially spaced indentations 12a. The metering valve is adapted to be mounted on a container 15 from which a pressurized fluid is to be discharged as an aerosol in metered quantities as individual puffs or sprays.

Figures 2, 3, 4:
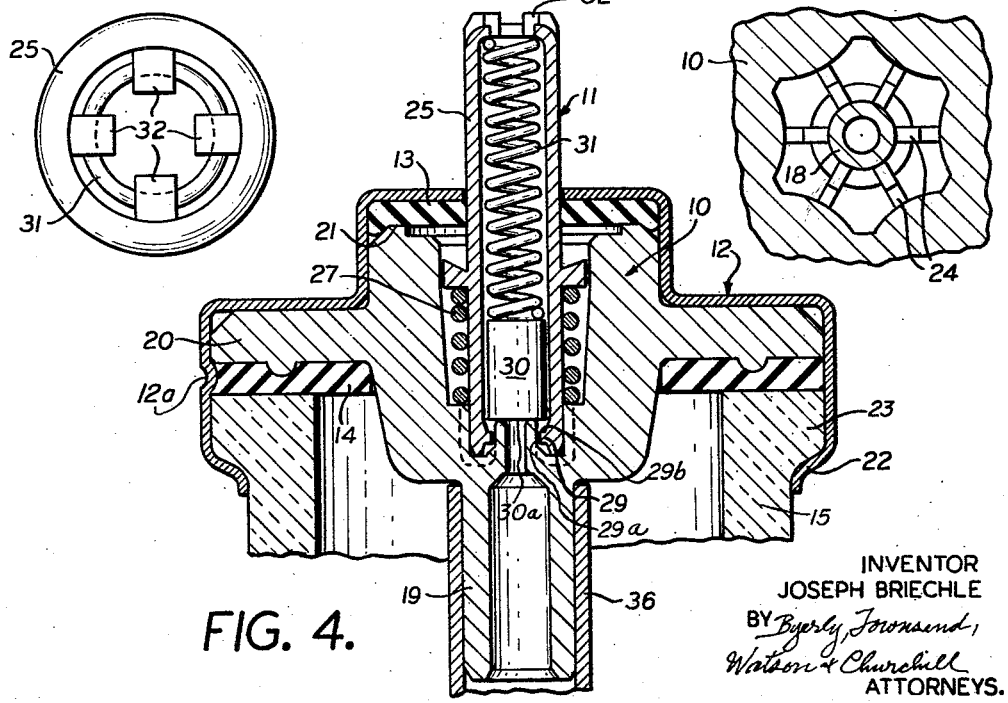
FIG. 2 is a top plan view of the plunger stem assembly forming part of the valve.
FIG. 3 is a transverse section taken substantially along the plane of the line 3—3 of FIG. 1.
FIG. 4 is a view similar to FIG. 1 showing the valve applied to a container and with the valve in dispensing or open position.

The body member 10 has an axial cup shaped socket 16 formed therein the inner end 17 of which is of reduced diameter and has extending upwardly from the base thereof a re-entrant nipple 18 and extending downwardly from said base a nipple 19. The body member 10 also has an external lateral flange 20. The top of the body member is formed with an annular rib 21 which is held in fluid tight engagement with the sealing washer 13 by the spaced indentations 12a and the assembled parts 10, 11 and 12 are clamped on the container 15 by inturning, rolling or otherwise locking a depending flange 22 on the closure cap 12 behind a top flange or bulbous portion 23 on the container as shown in FIG. 4. To insure a proper seal between the container and the assembled parts, a sealing washer 14 may be interposed between them and the flange 20 may be formed with an annular rib 20a for engaging the sealing washer 14. The socket portion 17 is formed with axially extending, circumferentially spaced ribs 24 which also extend across the base of the socket 16 for a purpose which will presently be described.

The plunger-stem assembly 11 consists of a hollow tubular stem 25 which is open at both ends and formed intermediate its ends with an external flange 26 which is biased into engagement with the sealing washer 13 by a spring 27, which bears at one end against the flange 26 and at its other end against a shoulder 28 formed at the juncture of the socket portions 16 and 17 in the body member. At its inner end the tubular stem 25 is formed with an internal annular flange 29 which has an inner diameter somewhat larger than the external diameter of the nipple 18 and is adapted to freely pass thereover in non-fluid tight relation when the tubular stem 25 is pressed inwardly in opposition to the force of spring 27. Seated on the internal flange 29 is a plug 30 preferably formed of synthetic resinous material which has limited deformability under compressive stress and is of smaller diameter than the inner diameter of the tubular stem 25 and is normally biased by a spring 31 onto the flange 29. The spring 31 which is under less compressive stress than spring 27 is held in position by staked or up-set portions 32 in the open top of the stem 25. The tubular stem is guided in its movements when pressed inwardly and then released, by the the ribs 24, a central opening 33 in the closure cap and a central opening 34 in the sealing washer 13 which latter provides a fluid tight seal with the tubular plunger stem 25 during such movements.

The outer wall portion of the tubular stem 25 which is disposed within the socket 16 in combination with the walls of said socket, the sealing washer 13 and the seated plug 30 normally provides a measuring chamber for the metering valve and governs the volume of pressurized fluid which will be released or discharged from the container upon each operation of the metering valve. With the valve parts in the relation shown in FIG. 1, the opening 18a through the nipple 18 constitutes an inlet port to the measuring chamber and the bore 29a through the internal flange 29 constitutes the outlet port from the measuring chamber. The top face 18b of the nipple 18 constitutes the inlet port valve seat, the inner flat face 29b of the annular flange 29 constitutes the outlet port valve seat and the bottom face 30a of the plug 30 constitutes a unitary valve member which is selectively seatable on said valve seats and controls both the inlet and the outlet ports of the measuring chamber. As is conventional with metering valves of the general character disclosed, an operating button 35 of any desired design is mounted on the outer end of the tubular stem 25 and a dip tube 36 is mounted on the depending nipple 19 and extends downwardly to the bottom of the container 15.

In the use and operation of the aerosol metering valve of the present invention it will be assumed that the valve is attached in a fluid tight manner to a container holding a quantity of an active substance to be dispensed, admixed with or dissolved in a low boiling point propellent and that the dip tube extends to the bottom of the container. Normally, the spring 27 will hold the plunger-stem assembly 11 in its uppermost position as shown in FIG. 1 with the valve plug 30 disengaged from the inlet port valve seat 18b at the top of the re-entrant nipple 18 whereupon the pressure of the propellent will force a quantity of the pressurized fluid up through the dip tube and the re-entrant nipple 18 into the measuring chamber. When the operating button 35 is pressed inwardly it moves the plunger-stem assembly inwardly to initially cause the base of the plug 30 to seat on the top 18b of the re-entrant nipple 18 and seal off the inlet port. Continued movement of the button inwardly causes the internal flange 19 to move over the outer wall of the re-entrant nipple 18 while the plug 30 remains in seating position on the inlet port under the force of the spring 27. This movement opens communication between the measuring chamber and the atmosphere by way of the spaces between the ribs 24 at the inner end of socket portion 17, the outlet port 29a to the interior of the tubular stem 25 around the wall of the plug 30 and out through the discharge opening in the button 35. As long as the button and tubular stem remain depressed the inlet port from the container to the measuring chamber will remain closed and hence no more than the measured quantity of pressurized fluid contained in the measuring chamber will be released or discharged from the container. As soon as pressure on the operating button is released the spring 27 will move the plunger-stem assembly outwardly thereby closing the outlet port and opening the inlet port for the admission of an additional charge of pressurized fluid to the measuring chamber for release therefrom upon a subsequent inward movement of the operating button. It will be understood of course, that the inlet port will be closed prior to the opening of the outlet port when releasing fluid from the measuring chamber and that the outlet port will close prior to opening the inlet port after operation of the valve.

It will thus be appreciated that I have provided a relatively simple and efficient metering valve construction for pressurized fluids and although I have shown and described a preferred embodiment of the invention applied to a bottle container, it will be apparent that the depending flange 22 on the closure cap may be directly connected to the open top of a metal container or bomb usually employed in the dispensing of aerosols; also that other changes in details of construction may be resorted to within the range of engineering and mechanical skill without departing from the spirit of the invention as hereinafter claimed.

What I claim is:

1. An aerosol metering valve intended for attachment to a container for a pressurized fluid to dispense measured amounts of such pressurized fluid as desired, said metering valve comprising a tubular body member having a socket therein, a spring-biased tubular plunger having a stem extending into and mounted for reciprocation in the socket in said body member, and a closure cap and sealing means for mounting said body member and plunger stem in assembled relation in a fluid-tight manner, said socket in the body member forming with said closure cap, sealing means and the stem portion which extends into the socket a measuring chamber having a fluid inlet port and a fluid outlet port, said ports each having a valve seat in proximity to each other, and a spring-biased valve member mounted and movable within the tubular plunger stem and having a seating surface for selective engagement on said valve seats to control the discharge of pressurized fluid from the measuring chamber and the admission of pressurized fluid thereinto, respectively, as the plunger stem is pressed inwardly and then released.

2. An aerosol metering valve according to claim 1, wherein both the inlet port valve seat and the outlet port valve seat are located at the inner end of the measuring chamber.

3. An aerosol metering valve according to claim 1, wherein the inlet port valve seat is on a re-entrant hollow nipple on the body member extending into the measuring chamber and the outlet port valve seat is at the inner end of the tubular plunger stem, is of somewhat larger diameter than the re-entrant nipple and is adapted to embrace said nipple in non-fluid tight relation when the tubular plunger stem is pressed inwardly into valve discharging position.

4. An aerosol metering valve according to claim 1, wherein the inlet port valve seat is on a re-entrant hollow nipple on the body member extending into the measuring chamber, the outlet port valve seat is at the inner end of the tubular plunger stem and is adapted to telescope said nipple in non-fluid tight relation when the plunger stem is pressed inwardly and wherein the valve member is a plug of valve seating material movable in the hollow plunger stem in non-fluid tight engagement with the bore wall of the plunger stem and normally seats on the outlet port valve seat and is unseated therefrom upon engagement thereof on the inlet port valve seat as the plunger is depressed to open communication between the measuring chamber and the interior of the tubular plunger stem.

5. An aerosol metering valve according to claim 4, wherein the valve member is a cylindrical plug of somewhat smaller diameter than the bore of the tubular plunger stem outwardly from the outlet port valve seat.

References Cited in the file of this patent

UNITED STATES PATENTS

| 2,375,215 | Davis | May 8, 1945 |
| 2,565,050 | Smith | Aug. 21, 1951 |
| 3,036,744 | Steiman et al. | May 29, 1962 |

FOREIGN PATENTS

| 1,111,464 | France | Oct. 26, 1955 |